(12) United States Patent  
Nord et al.

(10) Patent No.: US 9,742,681 B2
(45) Date of Patent: Aug. 22, 2017

(54) SESSION-BASED TRAFFIC ROUTING POLICIES

(71) Applicant: Sony Corporation, Tokyo (JP)

(72) Inventors: Lars Nord, Lund (SE); Peter Karlsson, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 83 days.

(21) Appl. No.: 14/073,444

(22) Filed: Nov. 6, 2013

(65) Prior Publication Data

US 2015/0124609 A1    May 7, 2015

(51) Int. Cl.
*H04L 12/801*  (2013.01)
*H04L 12/24*   (2006.01)
*H04W 24/02*   (2009.01)
*H04W 40/38*   (2009.01)
*H04W 84/22*   (2009.01)

(52) U.S. Cl.
CPC .......... *H04L 47/29* (2013.01); *H04L 41/0826* (2013.01); *H04W 24/02* (2013.01); *H04W 40/38* (2013.01); *H04W 84/22* (2013.01)

(58) Field of Classification Search
None
See application file for complete search history.

(56) References Cited

U.S. PATENT DOCUMENTS

2009/0116393 A1\*  5/2009  Hughes et al. ............... 370/238
2012/0092984 A1    4/2012  Mighani et al.
2014/0293829 A1\*  10/2014  Visuri et al. ................. 370/254

FOREIGN PATENT DOCUMENTS

EP        2239992 A2    10/2010
WO    2009039012 A1     3/2009
WO    2013138521 A1     9/2013

OTHER PUBLICATIONS

International Search Report and Written Opinion; Dec. 16, 2014; issued in International Patent Application No. PCT/EP2014/071315.
International Preliminary Report on Patentability; May 19, 2016; issued in International Patent Application No. PCT/EP2014/071315.

\* cited by examiner

*Primary Examiner* — Kouroush Mohebbi
(74) *Attorney, Agent, or Firm* — James C. Edwards; Moore & Van Allen, PLLC

(57) ABSTRACT

The invention is directed to systems, methods and computer program products for optimizing a configuration associated with a network. An exemplary method comprises: determining a node of the network is running a data session associated with an amount of data greater than a predetermined amount of data, and associated with a duration greater than a predetermined duration; configuring the network such that the node acts as an access point; and establishing a direct connection between the access point and a backbone of the network.

13 Claims, 7 Drawing Sheets

SESSION-BASED TRAFFIC ROUTING POLICIES

BACKGROUND

Routing information protocol (RIP) is a routing protocol used in mesh networks. RIP uses the number of hops as a metric to determine a route through a network. Evolution has replaced RIP with other more efficient protocols, e.g., Open Shortest Path First (OSPF). OSPF is widely used in large enterprise mesh networks. OSPF uses various measures to calculate the cost of routing packets through the network. Methods implementing OSPF consider latency, throughput, availability and reliability. There are various ways to mitigate high congestion or minimize the creation of local high traffic loads in the nodes associated with mesh network. One example is to alternate the selected route for each packet, i.e., spreading the load on many routes and nodes through the mesh network. However, other methods are required to address congestion and high load scenarios on mesh networks.

BRIEF SUMMARY

Embodiments of the invention are directed to systems, methods and computer program products for optimizing a configuration associated with a mesh network. An exemplary method comprises: determining, using a computing device processor, a node of the network is running a data session associated with an amount of data greater than a predetermined amount of data, and associated with a duration greater than a predetermined duration; configuring, using a computing device processor, the network such that the node acts as an access point; and establishing, using a computing device processor, a direct connection between the access point and a backbone of the network.

In some embodiments, the method comprises providing information associated with the data session to other nodes on the network.

In some embodiments, the method comprises providing information associated with the data session to the backbone of the network.

In some embodiments, the method comprises blacklisting the node acting as the access point.

In some embodiments, the blacklisted node is connected to few or no other nodes on the network.

In some embodiments, the method comprises upon determining the data session is terminated, reconfiguring the network such that the node no longer acts as the access point and such that the node is no longer blacklisted.

In some embodiments, the network comprises a mesh network.

In some embodiments, the network is enabled based on Open Shortest Path First (OSPF) protocol.

In some embodiments, the network comprises a radio local area network (R-LAN).

In some embodiments, the R-LAN comprises a cellular network.

In some embodiments, the node is associated with a device.

In some embodiments, the device comprises at least one of a mobile computing device, a non-mobile computing device, a mobile phone, a television, a watch, or a tablet computing device.

In some embodiments, the data session comprises a media session.

In some embodiments, the node is part of a moving cell, and configuring the network comprises breaking the node from the moving cell.

In some embodiments, an apparatus is provided for optimizing a configuration associated with a network. The apparatus comprises: a memory; a processor; and a module stored in the memory, executable by the processor, and configured to: determine a node of the network is running a data session associated with an amount of data greater than a predetermined amount of data, and associated with a duration greater than a predetermined duration; configure the network such that the node acts as an access point; and establish a direct connection between the access point and a backbone of the network.

In some embodiments, a computer program product is provided for optimizing a configuration associated with a network. The computer program product comprises a non-transitory computer-readable medium comprising a set of codes for causing a computer to: determine a node of the network is running a data session associated with an amount of data greater than a predetermined amount of data, and associated with a duration greater than a predetermined duration; configure the network such that the node acts as an access point; and establish a direct connection between the access point and a backbone of the network.

BRIEF DESCRIPTION OF THE DRAWINGS

Figure 1:
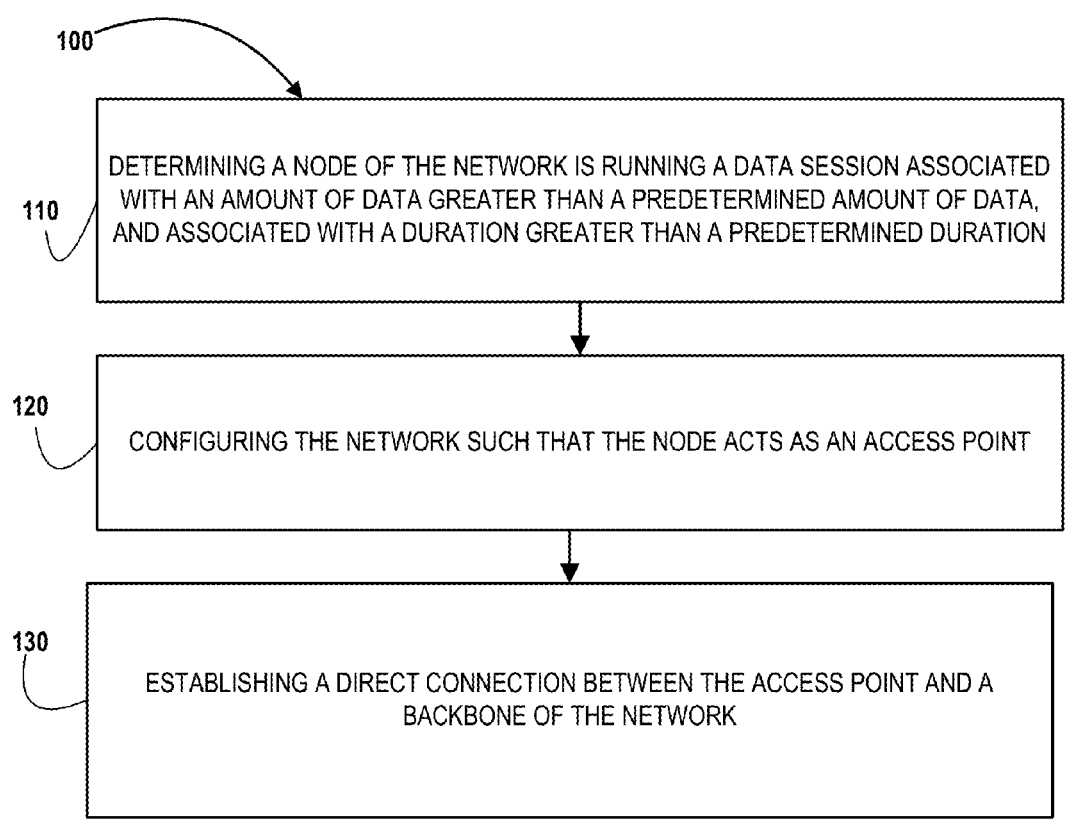
Figure 2:
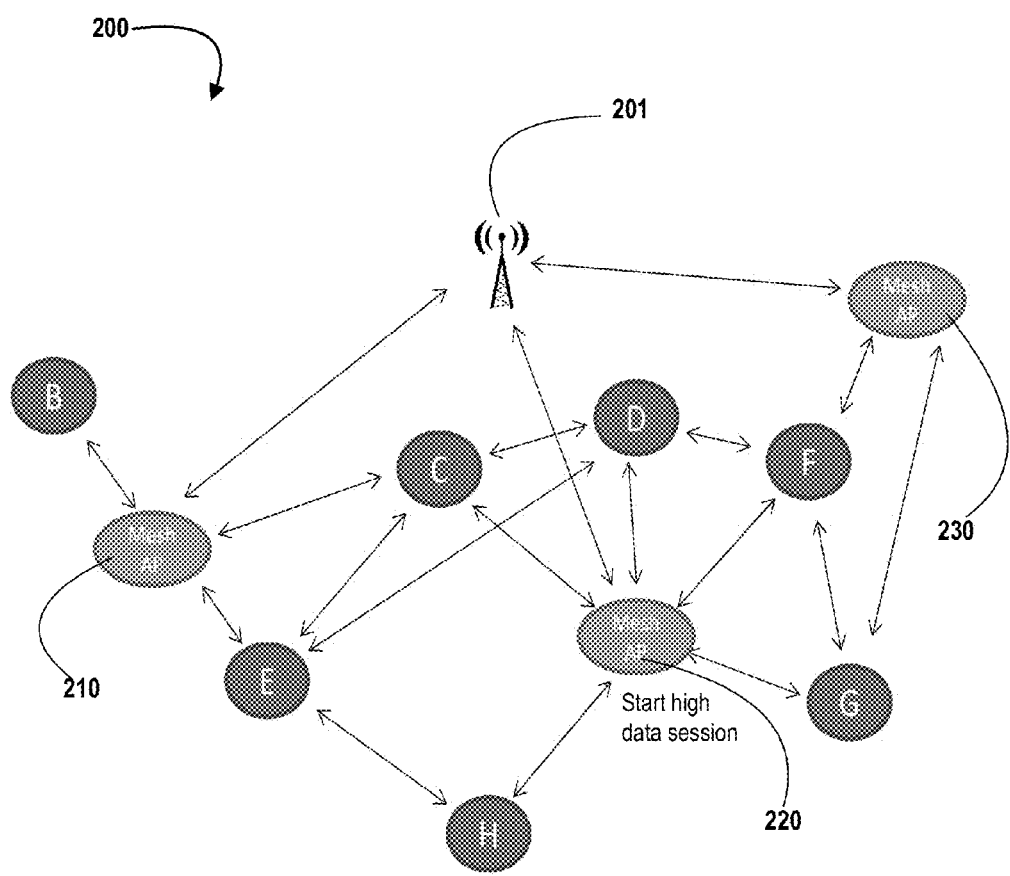
Figure 3:
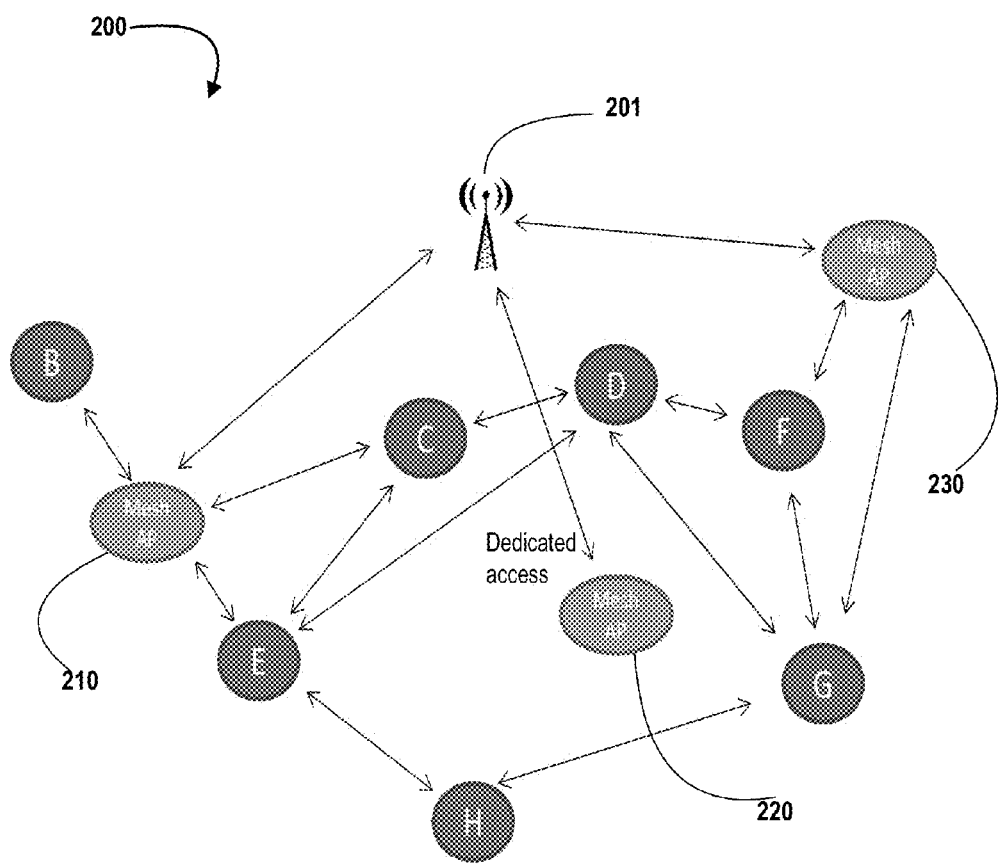
Figure 4:
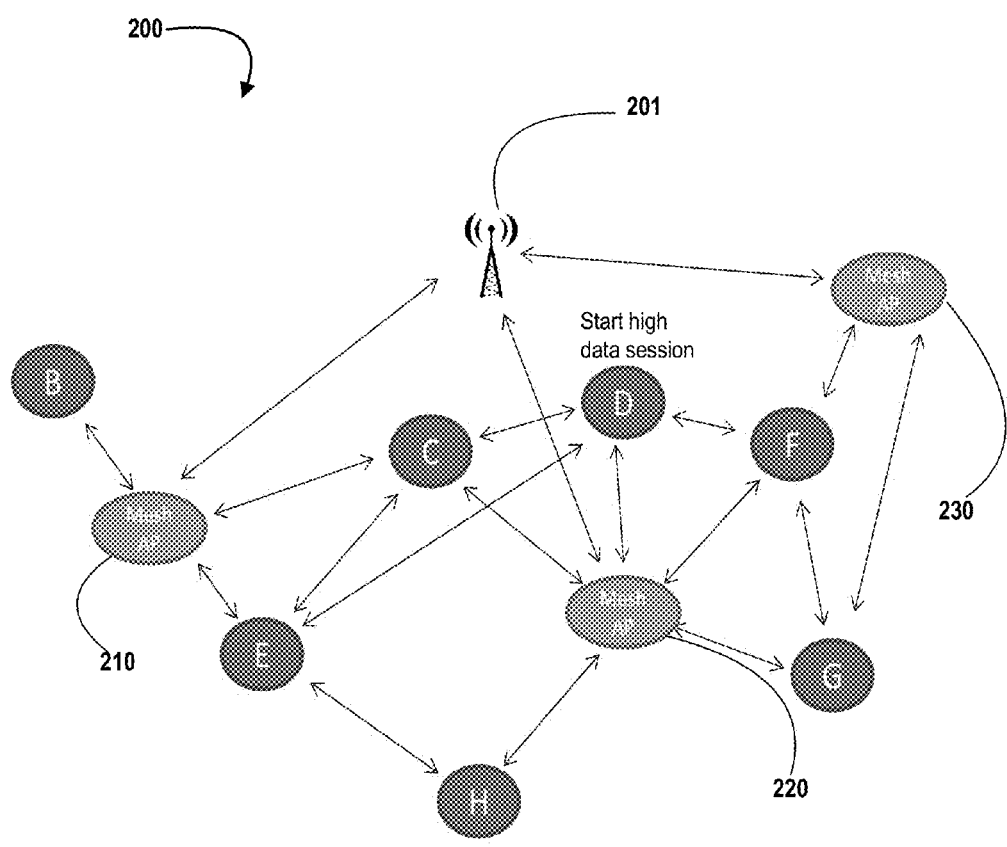
Figure 5:
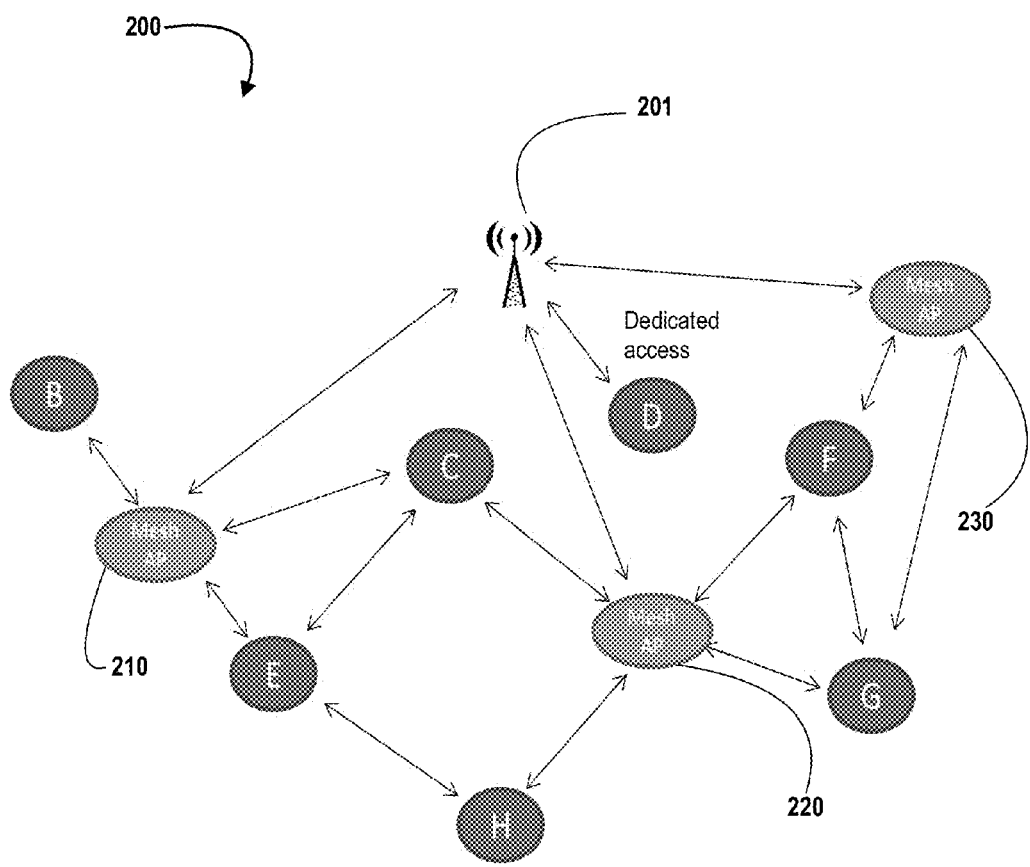
Figure 6:
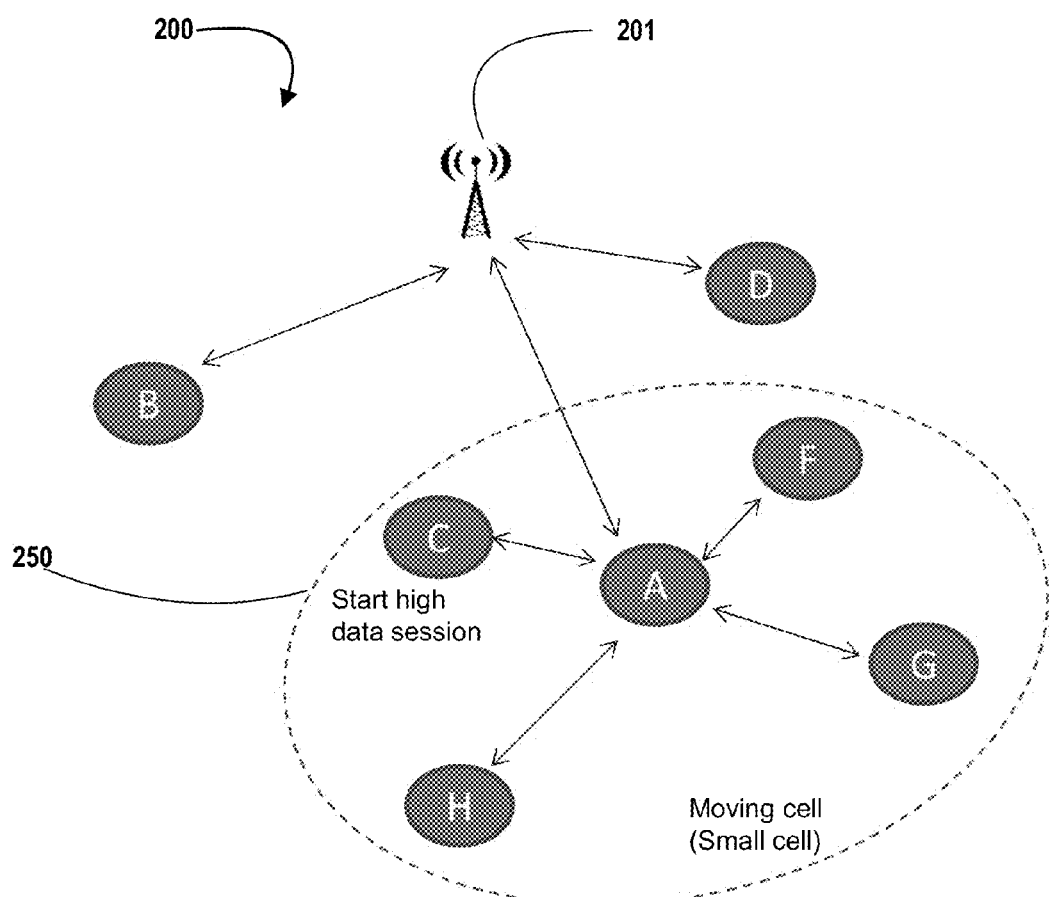
Figure 7:
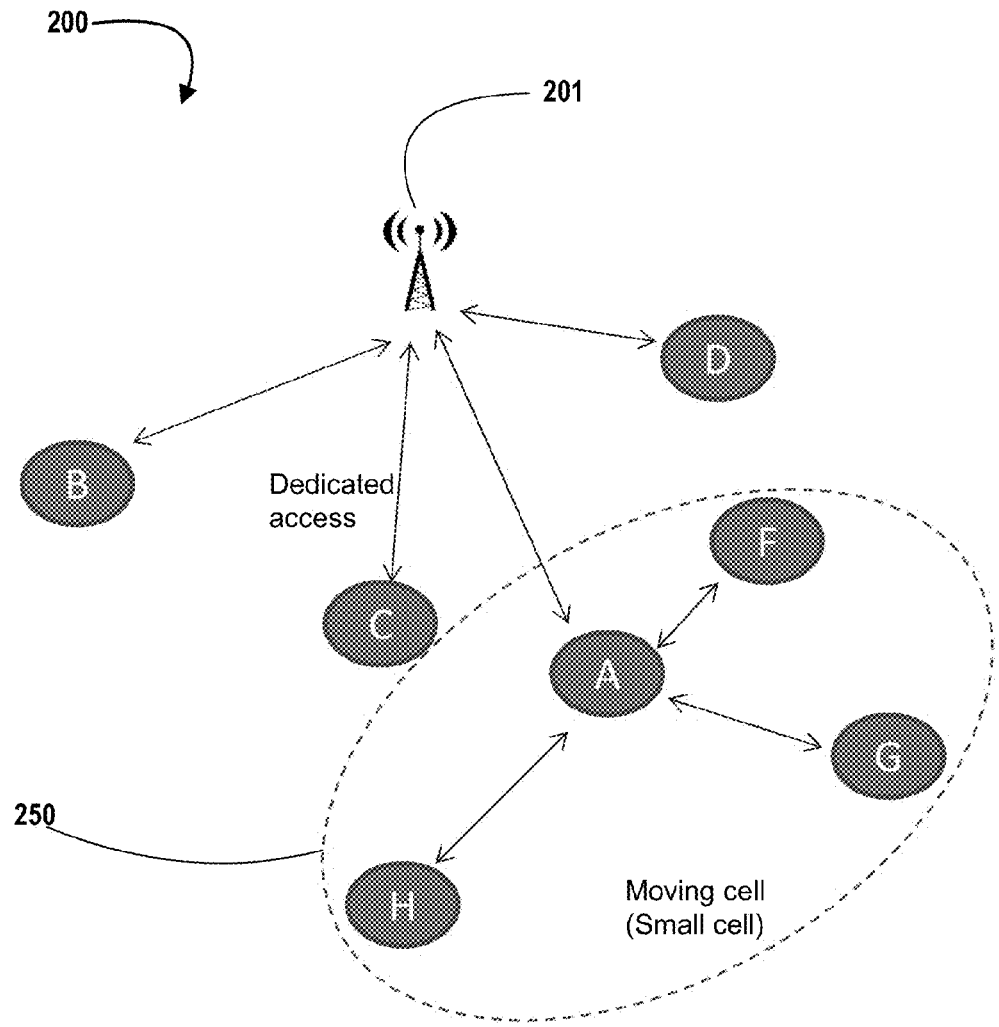

Having thus described embodiments of the invention in general terms, reference will now be made to the accompanying drawings, where:

FIG. 1 is an exemplary process flow for optimizing a configuration associated with a mesh network, in accordance with embodiments of the present invention;

FIG. 2 displays an exemplary mesh network with nodes B, C, D, E, F, G, H, mesh APs and a backbone;

FIG. 3 indicates that the mesh network of FIG. 2 is reconfigured such that mesh AP is provided dedicated access to the backbone;

FIG. 4 indicates that mesh node D of FIG. 2 starts a high data session with mesh AP;

FIG. 5 indicates that the mesh network of FIG. 2 is reconfigured such that the mesh node D is provided dedicated access to the backbone;

FIG. 6 displays a cellular network (e.g., a 5G network) with nodes A, B, C, D, F, G, H, and a backbone; and FIG. 7 displays a reconfigured version of the cellular network in FIG. 6.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for optimizing a configuration associated with a mesh network. As used herein, a network may be a wired or wireless network (e.g., a WLAN). Each device on the mesh network may be connected to one or more other devices. As used herein, a device may be associated with or may also be referred to as a node or as user equipment (UE).

Devices in wireless networks can be connected in a mesh structure, i.e., one device is connected to one or more other devices in an ad-hoc manner. Each device in a mesh network is referred to as a node. In such networks, data traffic needs to find its way from the transmitting node to the receiving node by jumping through one or more other nodes. The present invention is directed to addressing congestion and high load scenarios in mesh networks without providing new or alternative routing methods for data packets.

In mobile networks (including evolution of $3^{rd}$ Generation Partnership Project (3GPP) releases and $5^{th}$ Generation (5G) releases), user equipment (UE) may be used as "small cell" base stations, sometimes referred to as moving cells. These cells operate under the control of the larger network (e.g., the backbone of the larger network). The cells are dynamically created, removed, and reconfigured.

Another initiative within 3GPP is Proximity based services (ProSe). Public safety is currently the driving application for ProSe. Mesh network solutions, e.g., 802.11s, that would enable larger out of coverage connectivity could be important for ProSe. In a mesh network, there can be multiple nodes with connectivity to the backbone of the network.—As used herein, a mesh access point (mesh AP) is a node with a connection to the backbone, and enables other nodes to establish connections to the backbone. The connection to the backbone can be either a wired connection or a wireless connection. For a wireless connection, the connection to the backbone may be via a WiFi access point or a cellular base station. It is likely that many, if not all, of the nodes have the capability to act as mesh APs. The overall network configuration, i.e., how many mesh APs and which devices need to be assigned as mesh AP, is an important optimization consideration for a mesh network. Therefore, there is a need to generate metrics and obtain information associated with the nodes of the network in order to optimize the network configuration and modify the network configuration when needed. According to embodiments of the present invention, the session information available in the UEs is provided to other nodes in the network by sending information of the type of data session and predicted session duration or length to other nodes in the network, allowing the network to optimize routing decisions. As described herein, any process or function performed by the network may be performed by the backbone of the network.

The present invention is directed to enabling a network to optimize the link configuration and routing between nodes of a mesh network. The present invention enables the network to have knowledge about high load sessions (load greater than a predetermined amount of load) that last over a certain amount of time in order to optimize performance of the network. For example, if a UE that is temporarily acting as a mesh AP starts a video streaming session, the backbone of the network is notified. If this session lasts more than a predetermined duration of time, it triggers a reformation of the mesh network. This node (i.e., the UE) will be temporary blacklisted as a mesh AP, and instead be connected directly to the backbone as an independent UE with no or limited number of nodes connected to the UE.

The session information available in the UE will be provided to other nodes in the network by sending information of the type of data session (e.g., high load, low load, type of data (e.g., audio, video, etc.), etc.) and predicted session length of the data session. The session information may be provided to the other nodes by the UE or by some other device on the network. Once the session is terminated, the blacklisted UE reenters the mesh network, or, in a cellular system, makes a cell reselection request to hand over to another cell if this is the most optimum network configuration.

In networks based on the OSPF protocol, the UE and the former mesh AP will be considered not available and packets will find alternative routes as normal. Once the session is terminated, the backbone considers reinstating the UE as a mesh AP or just as an ordinary mesh node.

In some embodiments of the invention, the backbone can also identify an independent mesh node for or during a session with high data needs (e.g., data needs greater than a predetermined amount of data needs), and break the UE associated with the node out of the mesh. This would be done by granting the UE direct access to the backbone (i.e., access that does not have go through other nodes of the network).

The benefit of the invention can be described as follows. By removing a node from the network, this reduces the number of possible routes within the network. This will lower the control signaling for the routing protocol associated with the network. Therefore, high data channels (data channels carrying data greater than a predetermined amount) can be routed directly to the backbone without additional "jumps" in the mesh network. The backbone will apply these optimizations and dynamically reconfigure and control the mesh network's efficiency.

Referring now to FIG. 1, FIG. 1 describes an exemplary process flow 100 for optimizing a configuration associated with a mesh network. At step 110, the process flow comprises determining, using a computing device processor, a node of the network is running a data session associated with an amount of data greater than a predetermined amount of data, and associated with a duration greater than a predetermined duration. At step 120, the process flow comprises configuring, using a computing device processor, the network such that the node acts as an access point. Therefore, the node acting as the access point has a connection to the backbone, but does not serve other nodes (or serves few or limited number of nodes) due to the high load being processed by the node. The trigger for configuring the network is at least one of an amount of data associated with the data session or a duration of the data session. At step 130, the process flow comprises establishing, using a computing device processor, a direct connection between the access point and a backbone of the network.

Referring now to FIG. 2, FIG. 2 displays an exemplary mesh network 200 with nodes B, C, D, E, F, G, H, mesh APs 210, 220, and 230, and a backbone 201. The backbone 201 may be a server or base station. As indicated in FIG. 2, mesh AP 220 starts a high data session with the backbone 201, i.e., a data session associated with an amount of data greater than a predetermined amount of data and associated with a duration greater than a predetermined duration.

Referring now to FIG. 3, FIG. 3 indicates that the mesh network 200 of FIG. 2 is reconfigured such that mesh AP 220 is provided dedicated access to the backbone 201. This means that the mesh network 200 maintains a direct connection between mesh AP 220 and the backbone 201. Furthermore, the nodes connected to the mesh AP 220 will need to connect to other mesh APs (210 or 230) for backbone service. Mesh AP 220 uses this direct connection or channel to exclusively transmit or receive data from the backbone 201. During the high data session, mesh AP 220 is not routable.

Referring now to FIG. 4, FIG. 4 indicates that mesh node D of FIG. 2 starts a high data session with mesh AP 220.

Referring now to FIG. 5, FIG. 5 indicates that the mesh network 200 of FIG. 2 is reconfigured such that the mesh node D is provided dedicated access to the backbone 201. This reconfiguration happens because the mesh network 200 (or the backbone 201) decides that network efficiency is greater if mesh node D gets a dedicated connection to the backbone 201 during the high data session. During the high data session, this node may not be routable.

Referring now to FIG. 6, FIG. 6 displays a cellular network 200 (e.g., a 5G network) with nodes A, B, C, D, F, G, H, and a backbone 201. Nodes A, C, F, G, and H form a moving cell 250 or a small cell as described herein. The moving cell is created by assigning a UE (i.e., node A) to act as a base station to several UEs (nodes C, F, G, and H). As indicated in FIG. 6, node C starts a high data session with node A. Therefore, node C does not need to start a high data session with the backbone 201.

Referring now to FIG. 7, FIG. 7 indicates that the cellular network 200 of FIG. 6 is reconfigured such that moving cell 250 now comprises nodes A, F, G, and H, and such that node C is provided dedicated access to the backbone 201. This reconfiguration happens because the cellular network (or the backbone 201) decides that network efficiency is greater than if node C gets a dedicated connection to the backbone 201 during the high data session.

Each device associated with each node (and each mesh AP and the base station) in FIGS. 2-7 includes a processor, a memory, and a module stored in the memory, executable by the processor, and configured to perform the various processes described herein, including the capability to communicate with other devices on the network.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for optimizing a configuration associated with a mesh network, the method comprising:
   determining, using a computing apparatus, that a node of the mesh network is running a data session having (i) an actual or predicted amount of data communicated to the node during the data session greater than a predetermined amount of data, and (ii) a predicted duration of the data session greater than a predetermined period of time;
   in response to determining that the node is running the data session having (i) the actual or predicted amount of data communicated to the node during the data session greater than a predetermined amount of data, and (ii) the predicted duration of the data session greater than the predetermined period of time:
      configuring, using the computing apparatus, the mesh network such that the node is prevented from acting as a mesh access point in the mesh network, wherein configuring the mesh network comprises adding the node to a blacklist stored in the mesh network, wherein adding the node to the blacklist prevents the node from being either (i) a mesh access point in a mesh network, or (ii) a part of a moving cell, during the data session;
      establishing, using the computing apparatus, a direct connection between the access point and a backbone of the mesh network;
   and
   in response to determining that the data session has terminated, reconfiguring, using the computing apparatus, the mesh network by removing the node from the blacklist, such that the node is no longer prevented from being the mesh access point in the mesh network.

2. The method of claim 1, further comprising providing information associated with the data session to other nodes on the mesh network, wherein the information includes type of data session and the predicted duration of the data session.

3. The method of claim 1, further comprising providing information associated with the data session to the backbone of the mesh network, wherein the information includes type of data session and the predicted duration of the data session.

4. The method of claim 1, wherein the node is connected to no other nodes on the mesh network during the data session.

5. The method of claim 1, wherein the mesh network is enabled based on Open Shortest Path First (OSPF) protocol.

6. The method of claim 1, wherein the mesh network comprises a radio local area network (R-LAN).

7. The method of claim 6, wherein the R-LAN comprises a cellular network.

8. The method of claim 1, wherein the node is associated with a device.

9. The method of claim 8, wherein the device comprises at least one of a mobile computing device, a non-mobile computing device, a mobile phone, a television, a watch, or a tablet computing device.

10. The method of claim 1, wherein the data session comprises a media session.

11. The method of claim 1, wherein the node is part of a moving cell, and wherein configuring the mesh network further comprises breaking the node from the moving cell.

12. An apparatus for optimizing a configuration associated with a mesh network, the apparatus comprising:
   a memory;
   a processor in communication with the memory; and
   a module stored in the memory, executable by the processor, and configured to:
      determine that a node of the mesh network is running a data session (i) having an actual or predicted amount of data communicated to the node during the data session greater than a predetermined amount of data, and (ii) a predicted duration of the data session greater than a predetermined period of time, in response to determining that the node is running the data session having (i) the actual or predicted amount of data communicated to the node during the data session greater than a predetermined amount of data, and (ii) the predicted duration of the data session greater than the predetermined period of time:
  configure the mesh network such that the node is prevented from acting as a mesh access point in the mesh network, wherein configuring the mesh network comprises adding the node to a blacklist stored in the mesh network, wherein adding the node to the blacklist prevents the node from being either (i) a mesh access point in a mesh network, or (ii) a part of a moving cell, during the data session,
  establish a direct connection between the access point and a backbone of the mesh network,
  and
  in response to determining that the data session has terminated, reconfigure the mesh network by removing the node from the blacklist, such that the node is no longer prevented from being the mesh access point in the mesh network.

13. A computer program product for optimizing a configuration associated with a mesh network, the computer program product comprising:
  a non-transitory computer-readable medium comprising a set of codes for causing a computer to:
    determine that a node of the mesh network is running a data session having (i) an actual or predicted amount of data communicated to the node during the data session greater than a predetermined amount of data, and (ii) a predicted duration of the data session greater than a predetermined period of time;
    in response to determining that the node is running the data session having (i) the actual or predicted amount of data communicated to the node during the data session greater than a predetermined amount of data, and (ii) the predicted duration of the data session greater than the predetermined period of time:
      configure the mesh network such that the node is prevented from acting as a mesh access point in the mesh network, wherein configuring the mesh network comprises adding the node to a blacklist stored in the mesh network, wherein adding the node to the blacklist prevents the node from being either (i) a mesh access point in a mesh network, or (ii) a part of a moving cell, during the data session, and
      establish a direct connection between the access point and a backbone of the mesh network;
    and
    in response to determining that the data session has terminated, reconfigure the mesh network by removing the node from the blacklist such that the node is no longer prevented from being the mesh access point in a mesh network.

* * * * *